US012781664B2

United States Patent
Sánchez Moreno et al.

(10) Patent No.: US 12,781,664 B2
(45) Date of Patent: Nov. 3, 2026

(54) AIRCRAFT EXHAUST WASTE HEAT RECOVERY FOR ICING MITIGATION

(71) Applicant: GENERAL ELECTRIC COMPANY, Evendale, OH (US)

(72) Inventors: Humberto Sánchez Moreno, Queretaro (MX); Francisco Anaya Bravo, Queretaro (MX); Ana Sofía Espinosa Curiel, Queretaro (MX); Jeffrey D. Clements, Evendale, OH (US); Benjamin Schumacher, Evendale, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 19/095,454

(22) Filed: Mar. 31, 2025

(65) Prior Publication Data

US 2026/0298141 A1 Oct. 1, 2026

(51) Int. Cl.

| | |
|---|---|
| ***F02C 6/18*** | (2006.01) |
| ***B64D 37/34*** | (2006.01) |
| ***F02C 3/22*** | (2006.01) |
| ***F02C 6/06*** | (2006.01) |
| ***F02C 7/12*** | (2006.01) |
| ***F02C 9/18*** | (2006.01) |
| ***F23R 3/32*** | (2006.01) |

(52) U.S. Cl.

CPC ................ *F02C 6/18* (2013.01); *B64D 37/34* (2013.01); *F02C 3/22* (2013.01); *F02C 6/06* (2013.01); *F02C 7/12* (2013.01); *F02C 9/18* (2013.01); *F23R 3/32* (2013.01); *F05D 2220/323* (2013.01); *F05D 2260/20* (2013.01)

(58) Field of Classification Search

CPC ...... F02C 6/04; F02C 6/06; F02C 6/08; F02C 3/22; F02C 9/18; F05D 2260/20

See application file for complete search history.

(56) References Cited

U.S. PATENT DOCUMENTS

| | | | | |
|---|---|---|---|---|
| 2,786,341 A * | 3/1957 | Green | F25B 9/04 | 96/306 |
| 2,925,712 A * | 2/1960 | London | F02C 7/224 | 60/785 |
| 3,973,396 A * | 8/1976 | Kronogard | F02C 7/18 | 60/806 |

(Continued)

FOREIGN PATENT DOCUMENTS

EP 2351915 A1 8/2011

*Primary Examiner* — Alain Chau

(74) *Attorney, Agent, or Firm* — Carter, DeLuca & Farrell LLP

(57) ABSTRACT

A gas turbine engine for an aircraft includes a thermal bus with a plumbing system comprising a cold leg and a hot leg. A cryogenic fuel source containing liquid-phase hydrogen is in fluid communication with the cold leg. The plumbing system is also in fluid communication with a compressor section and a combustion section of the engine. A waste heat recovery (WHR) heat exchanger is thermally coupled to a core airflow path downstream of a turbine section and is configured to transfer heat to the plumbing system to vaporize the hydrogen fuel prior to combustion. The system enhances fuel phase management and thermal efficiency by utilizing recovered waste heat from the engine core.

20 Claims, 8 Drawing Sheets

(56) References Cited

U.S. PATENT DOCUMENTS 4,818,178 A * 4/1989 Sibbertsen ................ F25B 9/04 415/115
5,317,877 A * 6/1994 Stuart ..................... F02C 7/185 60/736
9,130,204 B2 9/2015 Hoffjann et al.
10,006,365 B2 * 6/2018 Ramirez ................. F02C 7/055
10,364,750 B2 7/2019 Rambo
11,047,307 B2 * 6/2021 Roberge .................... F02C 3/22
11,187,156 B2 11/2021 Niergarth et al.
11,242,800 B2 * 2/2022 Jain ......................... F02C 7/222
11,692,479 B2 7/2023 Rambo et al.
11,815,024 B2 11/2023 Niergarth et al.
12,092,042 B2 * 9/2024 Minas .................... B64D 37/30
12,385,438 B2 * 8/2025 Jouan ...................... F02C 7/224
2010/0319359 A1 12/2010 Holt et al.
2012/0048000 A1 * 3/2012 Kirzhner ............ F02M 37/0017 73/40.5 R
2013/0186059 A1 * 7/2013 Epstein ..................... F02C 3/22 60/260
2013/0232989 A1 * 9/2013 Osorio ...................... F02C 9/28 60/779
2014/0102113 A1 4/2014 Cuevas et al.
2016/0258362 A1 * 9/2016 Cordatos ................... F02C 9/18
2017/0002739 A1 * 1/2017 Ramirez ................... F02C 6/08
2019/0137104 A1 * 5/2019 Jain ......................... F02C 7/222
2020/0088098 A1 * 3/2020 Roberge .................... F02C 7/16
2020/0088102 A1 * 3/2020 Roberge .................. F02C 7/224
2021/0340914 A1 * 11/2021 Niergarth ................ F02C 7/141
2023/0122350 A1 * 4/2023 Minas ..................... F02C 7/224 60/39.281
2023/0243308 A1 * 8/2023 Jouan ...................... F02C 7/141 60/39.465
2023/0258131 A1 * 8/2023 Muldoon ................ F28D 7/106 60/772
2024/0218832 A1 * 7/2024 Casado Montero ... B64D 37/30
2024/0369015 A1 * 11/2024 Evans ....................... F02C 1/08
2025/0067218 A1 * 2/2025 Coulson .................... F02C 3/22

* cited by examiner

AIRCRAFT EXHAUST WASTE HEAT RECOVERY FOR ICING MITIGATION

TECHNICAL FIELD

The present disclosure relates to the use of aircraft exhaust waste heat recovery for mitigating icing in a closed-loop plumbing interconnection hardware system.

BACKGROUND

On a hydrogen ($H_2$) engine, a waste heat recovery (WHR) heat exchanger (HX) is placed at the exit of the core stream of an aircraft engine downstream from the engine's low-pressure turbine (LPT) and mounted in the engine's outlet guide vane (OGV). There is a need in the art for improvements to a WHR HX for mitigating icing in aerospace applications.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

DETAILED DESCRIPTION

Figure 1A:
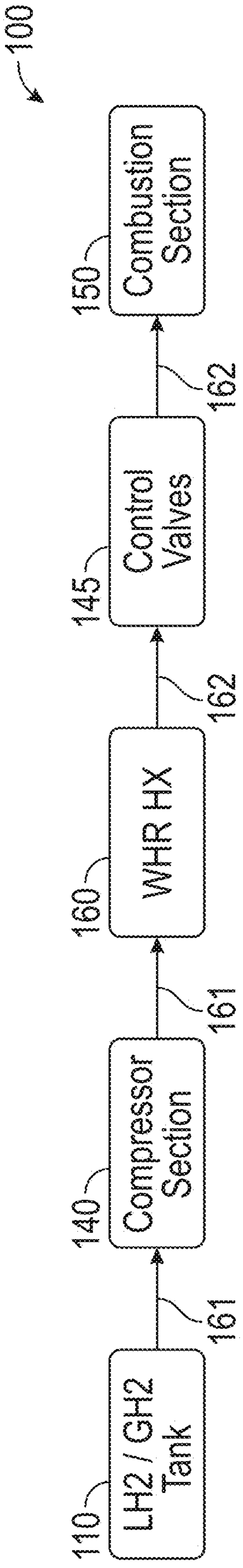
FIG. 1A illustrates a thermal management plumbing system, according to aspects of the present disclosure.

Prior to discussing the drawings of the present disclosure at length, several terms and concepts are covered in order to facilitate the detailed description of the exemplary embodiments depicted in the drawings. It is noted that however that these terms and concepts do not limit the disclosure and that one of ordinary skill in the relevant art(s) will readily recognize modifications and changes applicable to the following ancillary systems and/or concepts that do not limit the scope of the present teachings.

In aspects of the present disclosure, an aircraft engine includes a turbine section and an exhaust section, the turbine section and exhaust section together defining at least in part a core air flowpath. A waste heat recovery (WHR) heat exchanger (HX) is positioned to be in thermal communication with the core air flowpath within or downstream of the turbine section, the exhaust section, or both. The WHR may capture heat from the flow of gases through an aft portion of the turbine section and/or from a flow of exhaust through the exhaust section. The WHR uses the hot core air flowpath to heat an inert gas, which is used to heat Hydrogen ($H_2$) fuel to change the $H_2$ phase from liquid to gaseous temperatures for combustion.

The $H_2$ fuel supply fluid line is at cryogenic temperature (e.g., liquid phase) and in gaseous phase (e.g., near or below 0° C.). In various embodiments, thermal management plumbing connects from the WHR to an aircraft pylon 250 around a fan compartment or an exhaust system via a thrust reverser unit (TRU) 220. A cold leg system of the thermal management plumbing handles a cryogenic or an inert gas fluid (e.g., He, $N_2$, or the like) at subzero temperatures.

The WHR utilizes a large delta T between inlets (cold leg plumbing) and hot leg to meet with the energy to change the $H_2$ fluid from liquid phase to an optimal gaseous temperature for combustion. Given the low temperature in the cold leg plumbing in combination with ambient moisture and time, there will be a frost formation and accumulation around the plumbing hardware (e.g., pipes/tubes) during flight. Increasing the mass of the system, ice accumulation may lead to a potential impact in the natural frequencies, resulting in high cycle fatigue (HCF), which may break the pipes/tubes and/or put at risk the $H_2$vaporization process, impacting the engine performance and operability.

Typically, insulation is wrapped around a pipe/tube to help mitigate icing. However, for a pipe through which fluid is running at subzero temperatures (cryogenic or gas), air and moisture may eventually accumulate between the insulation and the pipe and freeze, thereby expanding and pushing the insulation away from the pipe.

As further detailed below, the present disclosure describes icing mitigation systems for reducing, eliminating, or preventing the accumulation or formation of ice during icing conditions within the flight envelope of an aircraft engine. For example, in an aspect of the present disclosure, a coating may be applied to an outer surface of the aircraft's plumbing to improve surface roughness. In another aspect of the present disclosure, an anti-ice chemical may be applied to surfaces of the aircraft's plumbing. In yet another aspect of the present disclosure, surfaces of the aircraft's plumbing may be heated using hot air (e.g., via hot air bleeding from the engine's compressor) and/or using electrical elements and/or a dryer (e.g., dryer 410 FIG. 4) to actively heat the aircraft's plumbing. In still yet another aspect of the present disclosure, double wall pipes/tubes may be introduced to the aircraft's plumbing.

In an aspect of the present disclosure, an anti-ice chemical may be added to surfaces of the plumbing. For example, a silica aerogel composite may be applied to the plumbing and may be prepared by impregnating nonwoven fabric, ceramic, glass, Kevlar, pyrol-xte, and basalt blankets with silica gel and drying it to transform it into aerogel. Silica aerogel is synthesized using two precursors (e.g., tetraethyl orthosilicate (TEOS) and Methyltrimethoxysilane (MTMS)) under ambient pressure drying. Before setting the gel, the fabric sample is wetted with the sol so that gelation takes place with the porous structure of the nonwoven fabric. Silica aerogel has excellent textural properties, higher thermal insulation performance value with less heat transfer, becoming a cryogenic application with a relatively low density and a relatively high surface area. The prepared blankets with aerogels are hydrophobic.

In various embodiments, a water drain collector is provided to collect condensation produced from the $H_2$ and inert gas when the ice starts melting (e.g., at 12 o'clock for the bifurcations and/or 3 o'clock for the TRU/Fan compartment). In various embodiments, a multitude of routing configurations, for any tubing clocking positions, any number of tubes, sizing, and workable materials for the transport of any inert gas to and from the WHR may be utilized (e.g., in the TRU and/or fan compartment). In systems utilizing hydrogen ($H_2$) and inert gases, condensation can form as ice melts due to temperature fluctuations, potentially leading to operational inefficiencies, blockages, or corrosion-related issues. Traditional drainage solutions may not be optimized for varying tubing orientations, spatial constraints, or gas transport requirements in complex waste heat recovery (WHR) systems. The disclosed water drain collector effectively addresses this issue by strategically collecting and removing condensation at designated locations (e.g., 12 o'clock for bifurcations and 3 o'clock for the TRU/Fan compartment 210), thereby preventing water buildup that could interfere with gas flow. By supporting various tubing orientations, configurations, sizes, and materials, the system enhances flexibility in design while maintaining efficient drainage. This results in improved system reliability, reduced risk of blockages, enhanced efficiency in gas transport, and mitigation of corrosion risks, ultimately optimizing the performance and longevity of the WHR system.

FIG. 1A illustrates a thermal management plumbing system 100 with direct H2 WHR vaporization for a cryogenic gas-fueled system according to an exemplary embodiment. An $H_2$ supply tank 110 feeds liquid $H_2(LH_2)$ and/or gaseous $H_2(GH_2)$ via a first leg 161 (e.g., one or more pipes/tubes) of the plumbing system 100 to a compressor section 140, which is in turn in fluid communication with a WHR HX 160 via the first leg 161. The first leg 161 may be a cold leg. In aspects of the present disclosure, the first leg 161 of the plumbing system 100 may be susceptible to icing during operation of an aircraft's engine (e.g., during flight). The WHR HX 160 is configured to recover waste heat from a combustion section 150 of an aircraft engine. The WHR HX 160 is in fluid communication with control valves 145 via a second leg 162 of the plumbing system 100. The second leg 162 places the WHR HX 160 in fluid communication with the combustion section 150 via the control valves 145. In aspects of the present disclosure, the first leg 161 and second leg 162 of the plumbing system 100 may be referred to in combination as a thermal bus. The second leg 162 may be a hot leg.

Figure 1B:
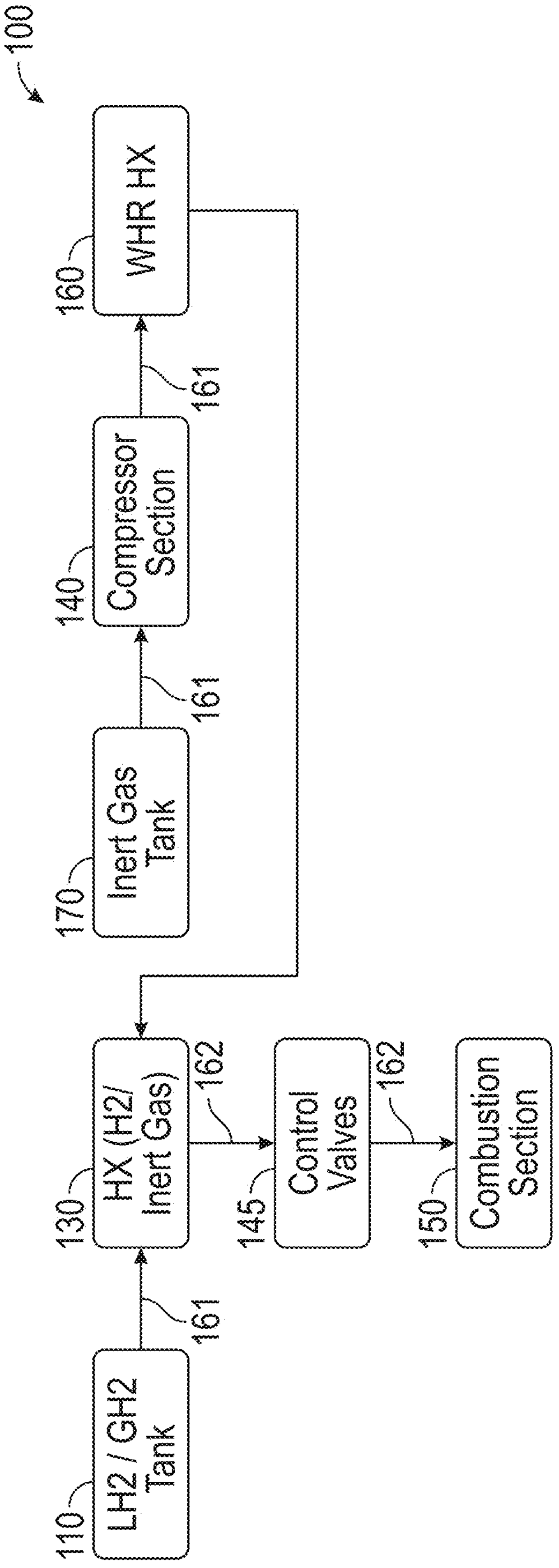
FIG. 1B illustrates a thermal management plumbing system with an inert gas bypass, according to aspects of the present disclosure.

FIG. 1B illustrates the thermal management plumbing system 100 of FIG. 1A including an additional $H_2$ WHR vaporization bypass that incorporates an inert cryogenic gas supply tank 170 and an $H_2$/inert gas HX 130 according to an exemplary embodiment of the present disclosure. The $H_2$ supply tank 110 feeds $LH_2$ and/or $GH_2$ to the $H_2$/inert gas HX 130 via the first leg 161 of the plumbing system 100. The first leg 161 of the plumbing system 100 places the inert cryogenic gas supply tank 170 in fluid communication with the compressor section 140 and the compressor section 140 in fluid communication with the WHR HX 160. The WHR HX 160 is in fluid communication with the $H_2$/inert gas HX 130 via the second leg 162. The second leg 162 places the $H_2$/inert gas HX 130 in fluid communication with the combustion section 150 via the control valves 145.

Figure 2:
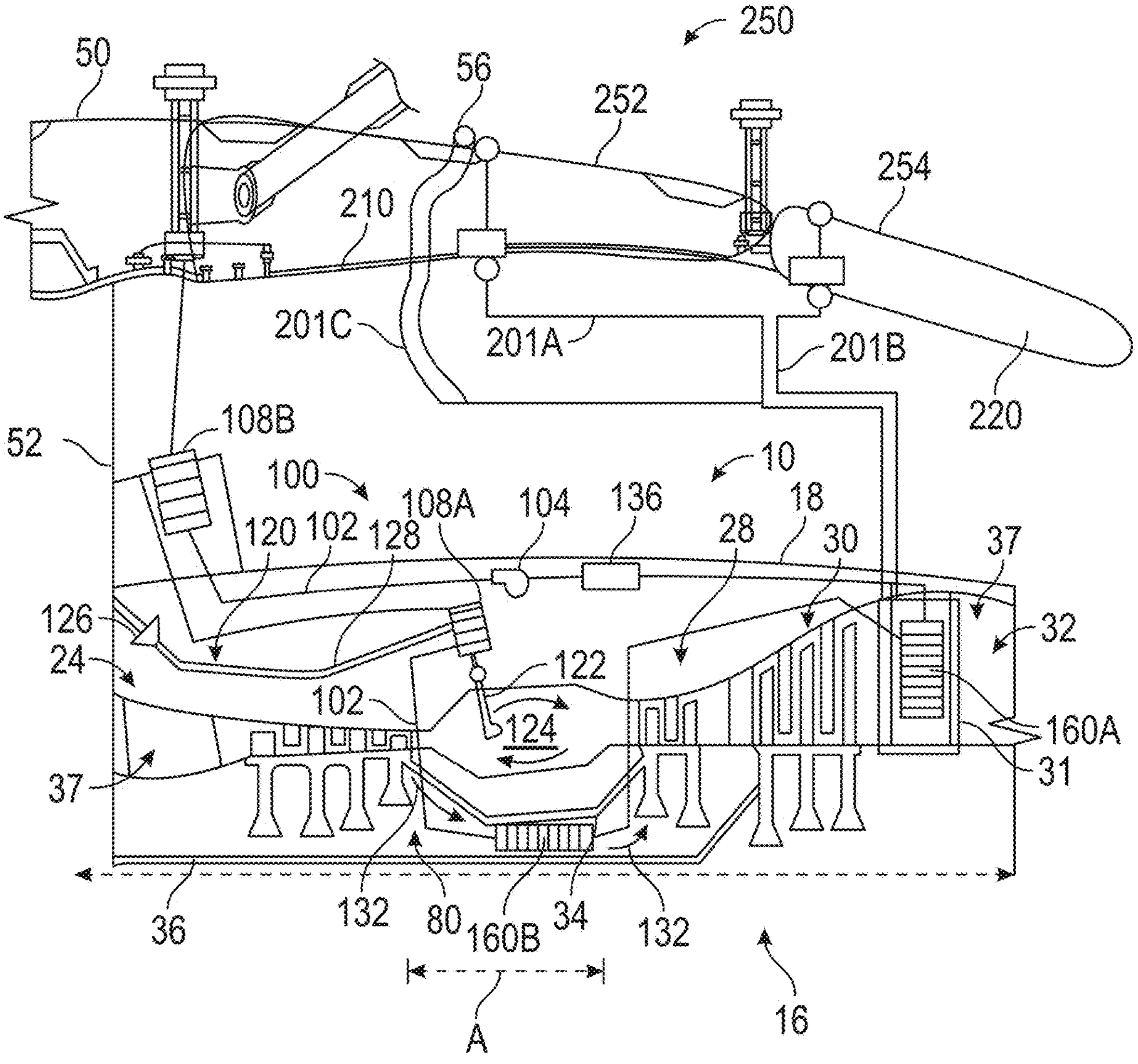
FIG. 2 is a schematic, cross-sectional view of a section of a gas turbine engine including the thermal management plumbing system of FIG. 1A or 1B, in accordance with aspects of the present disclosure.

Referring now to FIG. 2, a cross-sectional view of a gas turbine engine 10 including the thermal management plumbing system 100 in accordance with exemplary aspects of the present disclosure is provided. The thermal management plumbing system 100 may be configured in a similar manner to the exemplary thermal management plumbing system 100 described above with reference to FIGS. 1A and/or 1B. Accordingly, the same or similar numbers may refer to same or similar parts.

The exemplary gas turbine engine 10 of FIG. 2 includes a turbomachine 16 and an outer nacelle 50, with the turbomachine 16 at least partially surrounded by the outer nacelle 50. The outer nacelle 50 defines a bypass airflow passage 56 with the turbomachine 16 (e.g., between the outer nacelle 50 and the turbomachine 16), and more specifically, defines the bypass airflow passage 56 between the outer nacelle 50 and an outer casing 18 of the turbomachine 16. Furthermore, the gas turbine engine 10 includes an outlet guide vane 52 extending between the outer nacelle 50 and the turbomachine 16, the outlet guide vane 52 supporting the turbomachine 16 relative to the outer nacelle 50. In such a manner, the gas turbine engine 10 may be referred to as a turbofan engine. Further, it will be appreciated from FIG. 2, that the gas turbine engine 10 may further define a relatively high bypass ratio (e.g., 5:1 to 12:1 or greater), and therefore may be referred to as a "high-bypass" turbofan engine.

Referring still to FIG. 2, the exemplary turbomachine 16 depicted includes a compressor section 140, a combustion section 150, a turbine section, and an exhaust section 32. The compressor section 140, combustion section 150, turbine section, and exhaust section 32 together define at least in part a core air flowpath 37. Additionally, the compressor section 140 includes a high pressure ("HP") compressor 24, and the turbine section includes a low pressure ("LP") turbine 30 and an HP turbine 28. The LP turbine 30 is coupled to, and configured to drive, an LP spool 36, and the HP turbine 28 is coupled to and configured to drive, an HP spool 34. Notably, the HP spool 34 is further coupled to the HP compressor 24, such that the HP turbine 28 may drive the HP compressor 24 through the HP spool 34.

The turbomachine 16 further includes a fuel delivery system 120 for providing a fuel flow to the combustion section 150 of the turbomachine 16. For example, the exemplary fuel delivery system 120 includes one or more fuel nozzles 122 configured to provide a mixture of fuel and air to a combustion chamber 124 of the combustion section 150, as well as a fuel pump 126 and a plurality of fuel lines 128. The fuel pump 126 may provide for the fuel flow through the plurality of fuel lines 128 from a fuel source (not shown) to the plurality of fuel nozzles 122.

In at least certain exemplary embodiments, the thermal management plumbing system 100 may be configured in a similar manner as the exemplary thermal management plumbing system 100 described above with reference to FIG. 1A or 1B. For example, the thermal management plumbing system 100 depicted generally includes the WHR HX 160 configured to collect heat from the turbomachine 16 during operation (e.g., collect heat from one or more components of the turbomachine 16 during operation), a first heat sink heat exchanger (HX) 108A configured to reject heat during operation, and a thermal transport bus 102. The thermal transport bus 102 includes a heat exchange fluid configured to flow therethrough at a pressure within an operational pressure range during operation. The WHR HX 160 and first heat sink HX 108A are each thermally coupled to the thermal transport bus 102, and more specifically, to the heat exchange fluid within the thermal transport bus 102. In such a manner, the WHR HX 160 is operable to transfer heat to the heat exchange fluid flowing through the thermal transport bus 102 and the first heat sink HX 108A is conversely operable to transfer heat from the heat exchange fluid flowing through the thermal transport bus 102.

Notably, it will be appreciated that as used herein, the term "heat source" and "heat sink" as used to describe a heat exchanger refer to typical operation of the heat exchanger with respect to the thermal management plumbing system 100 and the thermal transport bus 102. For example, the WHR HX 160 is a heat exchanger that is operable to provide heat to the thermal management plumbing system 100 and the thermal transport bus 102. However, relative to other systems to which it is thermally connected, the WHR HX 160 may act as a heat sink. Similarly, for example, the first heat sink HX 108A is a heat exchanger that is operable to remove heat from the thermal management plumbing system 100 and the thermal transport bus 102. However, relative to other systems to which it is thermally connected, the first heat sink HX 108A may act as a heat source. Further, during certain operations of the engine and thermal management plumbing system 100, the WHR HX 160 may further be configured to act as a heat sink for the thermal management plumbing system 100 and the first heat sink HX 108A may further be configured to act as a heat source for the thermal management plumbing system 100.

More specifically, for the embodiment depicted, the WHR HX 160 is a first heat source HX 160A, and the thermal management plumbing system 100 further includes a second heat source HX 160B. The first heat source HX 160A is, for the embodiment shown, a WHR HX. More specifically, for the embodiment depicted, the WHR HX 160A is positioned to be in thermal communication with the core air flowpath 37 within or downstream of, the turbine section, the exhaust section 32, or both. More specifically, still, for the embodiment depicted, the waste heat recovery heat exchanger is integrated into an aft strut/outlet guide vane 31 of the LP turbine 30 at a downstream end of the LP turbine 30 of the turbomachine 16 (e.g., downstream of the turbine rotor blades within the turbine section of the gas turbine engine). Accordingly, the WHR HX 160A may capture heat from the flow of gases through an aft portion of the turbine section and/or from a flow of exhaust through the exhaust section 32.

Further, it will be appreciated that the exemplary gas turbine engine depicted includes a cooling air system 80, and the second heat source HX 160B is configured as a cooling air system HX for the cooling air system. As will be appreciated, the cooling air system may provide an airflow 132 from the compressor section to the turbine section, with such airflow 132 being used as cooling air for the turbine section. The cooling air system HX may remove heat from the airflow 132 from the compressor section 140 prior to such airflow 132 being provided to the turbine section. In such a manner, the cooling air system HX may reduce a temperature of the airflow 132 being provided to the turbine section, such that the airflow 132 may be used more efficiently as cooling air.

Also, for the embodiment depicted, the heat sink HX is a first heat sink HX 108A, and the thermal management plumbing system 100 further includes a second heat sink HX 108B. The first heat sink HX 108A is, for the embodiment shown, a fuel HX thermally coupled to the fuel delivery system 120. More specifically, the fuel HX is thermally coupled to one of the plurality of fuel lines 128 of the fuel delivery system 120 such that the fuel HX may reject heat to a fuel flow therethrough. Although not shown, the thermal management plumbing system 100 may include one or more valves and lines configured to bypass the fuel HX during certain operating conditions, such as during low-power engine operation, startup, shutdown, or conditions where heat rejection via the fuel HX is not required or advantageous. For example, during phases of reduced heat load or scenarios where fuel temperatures must remain within certain limits, these valves and lines facilitate rerouting the heat exchange fluid directly between the WHR HX and other heat sinks or system components, thereby enhancing control of thermal management, reducing the risk of unnecessary ice formation, and improving overall system efficiency.

Moreover, for the embodiment depicted, the second heat sink HX 108B is a bypass airflow HX integrated into, or coupled to, one or more components positioned in, or otherwise exposed to, the bypass airflow passage 56. More specifically, for the embodiment depicted, the bypass airflow HX is integrated into, or coupled to, the outlet guide vane 52 of the gas turbine engine. By embedding or thermally coupling the bypass airflow HX into the outlet guide vane 52, the HX is exposed directly to the high-volume, relatively cooler airflow (compared to the hot core airflow) traveling through the bypass airflow passage 56. This direct exposure enhances heat transfer efficiency, enabling effective heat rejection as thermal energy from the heat exchange fluid within the bypass airflow HX is transferred directly to the cooler bypass airflow, thereby efficiently dissipating heat and improving overall system performance during engine operation. The thermal management plumbing system 100 further includes a pump 104 and a heater 136. The pump 104 is configured to increase a pressure of the heat exchange fluid within the thermal transport bus 102 such that the heat exchange fluid operates and/or flows through the thermal transport bus 102. Additionally, the heater 136 is configured to increase a temperature of the heat exchange fluid flowing through the thermal transport bus 102. For example, the heater 136 may be configured to increase a temperature of the heat exchange fluid within the thermal transport bus 102 during engine startup conditions, prior to the gas turbine engine reaching normal operating temperatures. This may therefore allow for the thermal engine system to operate in relatively low ambient temperature conditions (e.g., cold weather conditions such as winter environments, high-altitude locations, and/or polar regions). For example, the heater 136 may be configured to increase the temperature of the heat exchange fluid within the thermal transport bus 102 during initial/startup operations in various scenarios. In extremely cold environments, such as during aircraft operations in Arctic regions or high-altitude locations, ambient temperatures can drop well below freezing, making it difficult for the thermal engine system to reach optimal operating temperatures. Additionally, in early morning departures during winter months, fuel and lubrication fluids may be more viscous, requiring preheating to ensure efficient thermal management. Similarly, in standby conditions where the aircraft has been parked for an extended period in low temperatures, preheating the heat exchange fluid helps reduce thermal lag and improve overall system responsiveness. By pre-warming the system before the gas turbine engine reaches its full operating temperature, whether before takeoff, during taxiing, or in pre-flight preparations, the heater 136 ensures stable performance, minimizes wear on engine components, and enhances efficiency in low ambient temperature conditions.

FIG. 2 illustrates exemplary routing configurations of the thermal management plumbing system 100 integrated into an aircraft structure, highlighting key aircraft features for clarity. Specifically, a fan compartment 210 located within or adjacent to the aircraft pylon 250 provides an accessible and strategically positioned volume for plumbing routing. The aircraft pylon 250 structurally connects the turbomachine 16 of the gas turbine engine 10 to the aircraft, incorporating internal passages suitable for routing thermal management plumbing. An aircraft apron or stub wing 252 extends laterally from the aircraft pylon 250, further facilitating efficient and protected routing of the thermal management plumbing system toward the WHR HX 160A or other system components. Additionally, a thrust reverser unit (TRU) 220, also coupled to or integrated within the aircraft pylon 250, provides an alternative routing path through an adjacent apron/stub wing feature 254. These combined structural features of the fan compartment 210, pylon 250, apron/stub wing 252, TRU 220, and apron/stub wing 254 collectively offer versatile and compliant routing options for efficiently managing the flow of subzero inert fluids (liquid or gas) within the aircraft's thermal management system.

With continued reference to FIG. 1B and FIG. 2 for highlighting various piping/tubing routing configurations of the thermal management plumbing system 100, a first routing configuration 201A shows piping/tubing of the thermal management plumbing system 100 routed from the fan compartment 210 of the aircraft pylon 250 through the aircraft apron/stub wing 252 to the WHR HX 160A. A second routing configuration 201B shows piping/tubing of the thermal management plumbing system 100 routed from the TRU 220 of the aircraft pylon 250 through an aircraft apron/stub wing 252 to the WHR HX 160A. With reference to FIG. 1A and FIG. 2, a third routing configuration 201C shows piping/tubing of the thermal management plumbing system 100 routed from the fan compartment 210 of the aircraft pylon 250 through the aircraft apron/stub wing 252 to the first heat sink HX 108A. Each of the illustrated routing configurations of FIG. 2 comply with standards (such as ASTM A269 and ASTM A213 for stainless steel tubing suitable for cryogenic fluid transport) for transporting subzero inert fluid (liquid or gas) through the fan bypass bifurcation struts connecting to inlets at, for example, 180 degrees apart from one another relative to the central axis at the WHR HX 160A spigot connections and/or the first heat sink HX 108A spigot connections.

Various approaches for mitigating ice formation are envisioned by the present disclosure, examples of which include, without limitation: one or more insulation layers structurally integrated with the piping/tubing of the plumbing system 100 to reduce thermal conductivity and limit exposure to low ambient temperatures; one or more coatings applied to the piping/tubing of the plumbing system 100 to modify surface roughness (e.g., slurry honing), thereby reducing the likelihood of ice adhesion; a coolant material with high viscosity (e.g., grease or a silica aerogel composite) positioned on the outer surface of the piping/tubing of the plumbing system 100 to form a thermal barrier that minimizes condensation and subsequent ice formation; a dehumidifier and/or a vortex cooler structurally arranged to regulate humidity levels and introduce heated airflow from the LP-HP engine, preventing excessive moisture accumulation within the plumbing system 100; electric tape structurally integrated with the piping/tubing of the plumbing system 100 to provide localized heating and maintain surface temperatures above freezing thresholds; a double-walled piping/tubing configuration for one or more portions of the plumbing system 100, wherein an outer pipe/tube encapsulates an inner pipe/tube to create an insulating air or fluid barrier that stabilizes temperature fluctuations; an electropolished outer surface or a Mylar layer applied to the outer surface of the piping/tubing of the plumbing system 100 to enhance surface properties that resist ice accumulation; thermocouples embedded within the plumbing system 100 to monitor and regulate temperatures in real time, actively counteracting freezing conditions; and spiral tubes positioned around the piping/tubing of the plumbing system 100 to facilitate controlled heat exchange and remove heat from particular stages (e.g., 4th and 7th stages) of the compressor section 140. These structural features collectively enhance the reliability and efficiency of the plumbing system 100 in low-temperature operational environments.

As used herein, high viscosity refers to a fluid's resistance to flow. In simple terms, it describes how thick or sticky a liquid is. Fluids with high viscosity are "thicker" and flow more slowly compared to low-viscosity fluids. For example, honey, molasses, or motor oil at low temperatures have high viscosity because they flow more slowly than water, which has a low viscosity. High-viscosity materials are used to create a barrier or coat surfaces to help prevent ice formation. These materials are resistant to flow, which can help trap heat or limit the transfer of moisture.

Additionally, surface-finishing methods such as Abrasion Flow Machining (AFM) and electropolishing may be employed to further refine the surface finish of the plumbing hardware, significantly decreasing surface roughness and moisture retention. A protective Mylar layer may also be applied to the outer surfaces of piping/tubing within the plumbing system 100 to provide an effective barrier against moisture infiltration, further enhancing the overall resistance to ice accumulation. These structural features collectively enhance the reliability and efficiency of the plumbing system 100 in low-temperature operational environments.

In aspects of the present disclosure, improving surface roughness refers to reducing the arithmetic average roughness (Ra) value of plumbing surfaces from approximately 125 microinches or greater to lower values, such as 32 microinches or even smoother. Reducing surface roughness decreases microscopic peaks and valleys on plumbing hardware surfaces, thereby minimizing areas where moisture can accumulate and freeze. This improvement results in diminished ice formation and accumulation, reducing the associated risks of increased mass, structural fatigue, and thermal management inefficiencies within the aircraft's thermal management plumbing system.

In various embodiments of the present disclosure, a drainage hardware system (not shown) may be utilized to capture water and/or condensation resulting from ice melting in the fan compartment 210 and/or the TRU 220. Such drainage hardware system would typically be positioned at strategically determined low points or designated collection areas within the fan compartment 210 and/or the TRU 220, relative to other components of the thermal management plumbing system 100. Specifically, these drainage points may be arranged downstream or directly beneath piping/ tubing, insulation layers, valves, and other ice-prone structures to effectively capture and channel away water or condensation resulting from ice melt. Such placement ensures efficient drainage, prevents unintended water accumulation, and reduces risks of component corrosion and operational disruption.

Figure 3:
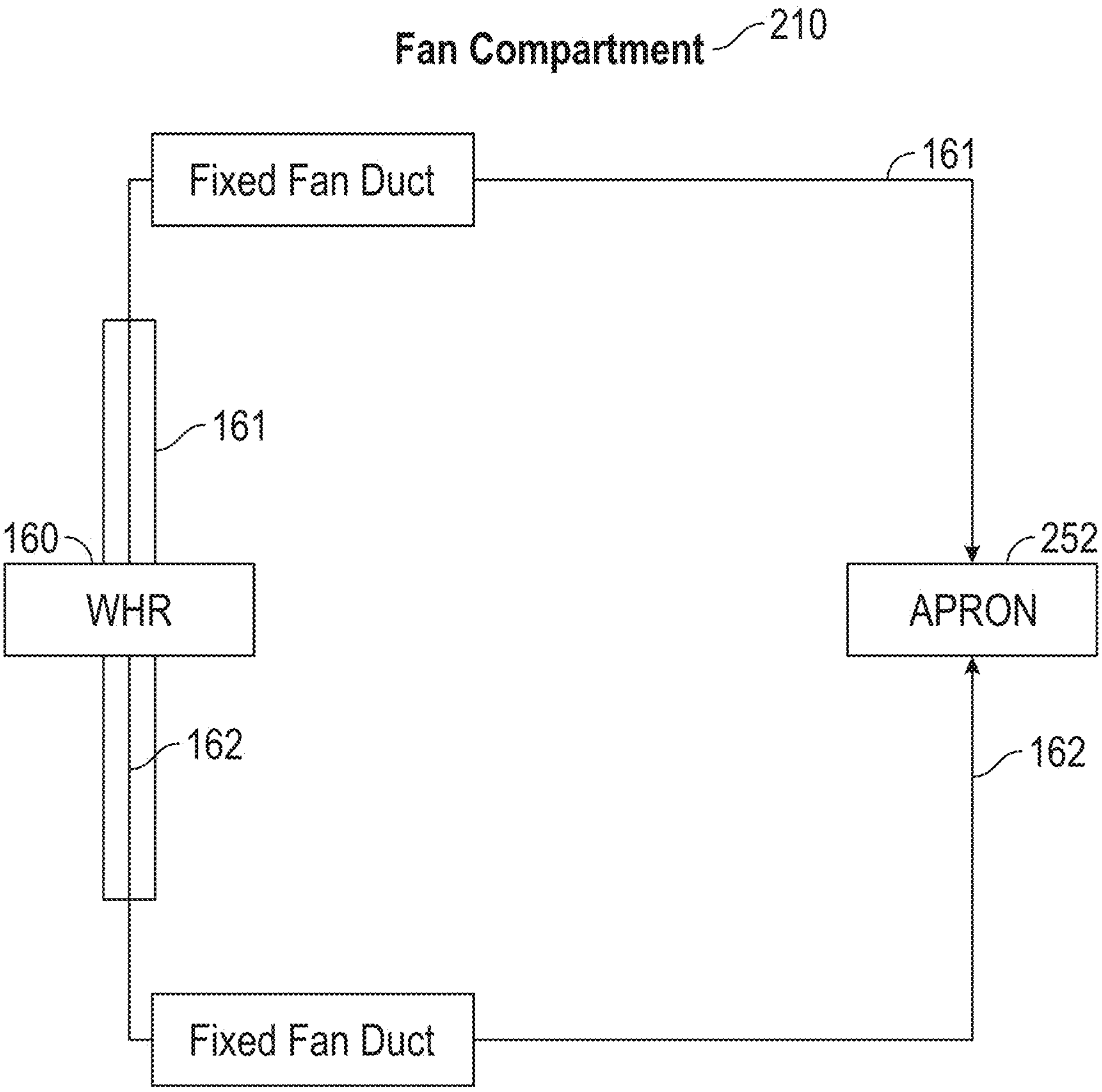
FIG. 3 illustrates the thermal management plumbing system of FIG. 1A or 1B implemented in a fan compartment of an aircraft, in accordance with aspects of the present disclosure.

FIG. 3 schematically illustrates an exemplary embodiment of the thermal management plumbing system 100 implemented in the fan compartment 210. The first leg 161 proceeds from an inlet connection 168 of the WHR HX 160 through the fan compartment 210 and exits through the fan compartment 210 via the aircraft apron/stub wing 252. The second leg 162 proceeds from an outlet connection 169 of the WHR HX 160 to the fan compartment 210 and exits through the aircraft apron/stub wing 252. Transition tubes (e.g., cold-hot legs) from the WHR HX 160 to the fan compartment 210 may be encapsulated by struts (e.g., bifurcations) to reduce icing impact.

Figure 4A:
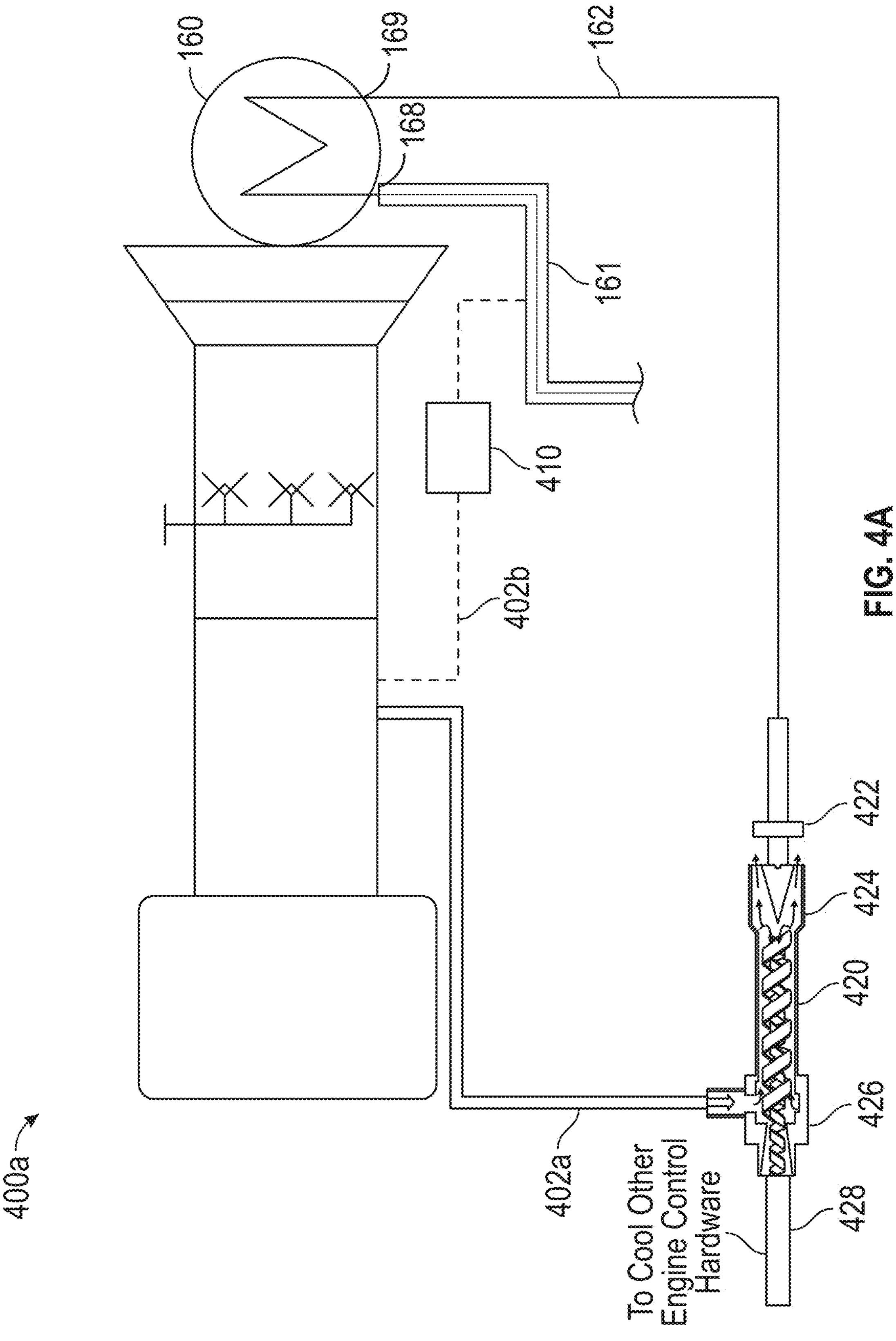
FIG. 4A illustrates an example bleed system for use with the thermal management plumbing system of FIG. 1A or 1B, in accordance with aspects of the present disclosure.

FIG. 4A illustrates an example bleed system 400*a* for a cryogenic-gas fueled system, in accordance with an exemplary embodiment. As shown in FIG. 4A, the first leg 161 proceeds from spigots at the inlet connections 168 of the WHR HX 160. The second leg 162 proceeds from the spigots at the outlet connections 169 of the WHR HX 160.

As mentioned above, the $H_2$ fuel supply and the first leg 161 of the WHR HX 160 are subject to icing. With the ice plumbing accreted, when the ambient air temperatures are above zero Celsius, the ice may start melting with a potential risk of damaging surrounding equipment and control hardware (e.g., electric components and cables, control valves, or the like) or corroding the mechanical components, resulting in an equipment limit life reduction. The features of the present disclosure provide the advantage of mitigating the icing of the cold leg161 amongst other components.

In an embodiment, the bleed system 400*a* includes a vortex cooler 420 that is fed heated inert gas (or air) from a bleed line 402*a* from a compressor or another engine source. A vortex cooler 420 uses compressed inert gas to create a temperature difference. Compressed inert gas enters the vortex cooler 420, where it is spun rapidly, creating a vortex inside the tube. Inside the vortex tube, the gas is forced to spin around the central axis of the tube. The shape and smooth surface of the chamber help maintain the swirling motion, as the gas accelerates along the curved walls. This chamber is typically a cylindrical or conical shape, which helps guide the gas into a circular motion. This spinning action causes the inert gas to separate into two streams: the outer part becomes cold, and the inner part becomes hot relative to each other. The cold inert gas is directed out of the vortex cooler 420, while the hot inert gas is expelled from the inner end. This process allows the vortex cooler 420 to provide a localized cooling effect, making it useful in applications where specific components, like those in jet engines or electronics, are kept at optimal temperatures (e.g., about 50 to about 150° C.). The vortex cooler 420 spins the heated inert gas in a vortex spin chamber 426 and exhausts cool inert gas out port 428 to cool other engine control hardware. The hot inert gas from the vortex spin chamber 426 is directed to a control valve 424 and a temperature regulator 422 which supplies the second leg 162 of the WHR HX 160. In aspects, the output of the temperature regulator may be directed to the first leg 161 of the WHR HX 160 to prevent the icing of the first leg 161. The temperature regulator 422 is configured to actuate the control valve based on a temperature of the hot inert gas.

In another embodiment, the bleed system 400*a* may include a dryer 410 (e.g., a dehumidifier) disposed along a first leg 161 of the WHR HX 160. Dryer 410 is fed heated inert gas (or air) from a bleed line 402*b* from, for example, a compressor or combustor section of a turbomachine or any other suitable hot gas or air source. The dry inert gas from the dryer 410 may be fed to the first leg 161 of the WHR HX 160 to prevent icing. In aspects, system 400*a* may only include a dryer 410 and not the vortex cooler 420.

In another embodiment, the bleed system 400*a* may include both the dryer 410 and the vortex cooler 420. For example, the dryer may be used to prevent the icing of the first leg 161 while the vortex cooler 420 supplies heated inert gas to the second leg 162 of the WHR HX 160.

Figure 4B:
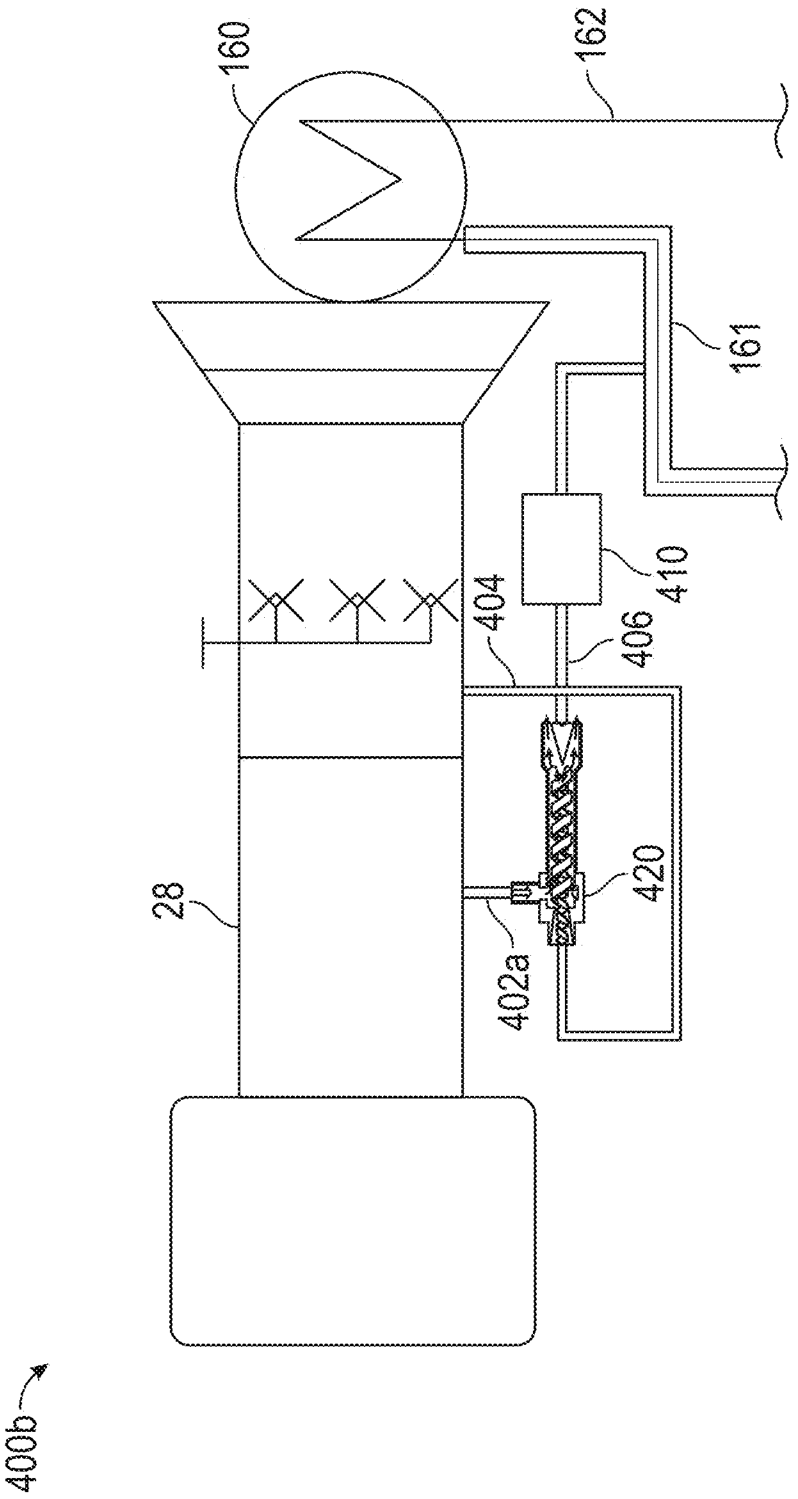
FIG. 4B illustrates another example of a bleed system for use with the thermal management plumbing system of FIG. 1A or 1B, in accordance with aspects of the present disclosure.

FIG. 4B illustrates another example bleed system 400*b* for a cryogenic-gas fueled system, in accordance with an exemplary embodiment. Bleed system 400*b* includes a vortex cooler 420 and a dryer 410. The dryer 410 can be used with the vortex cooler 420 on the second leg 162 to ensure the hot inert gas expelled is dry and free from moisture. The vortex cooler 420 is fed heated inert gas from a bleed line 402*a* from a compressor or another engine source. The heated inert gas from the vortex cooler 420 is directed to the dryer 410 via line 406. The cooled inert gas from the vortex cooler 420 is directed via line 404 to the turbine section. As the hot inert gas exits the vortex cooler 420, the hot inert gas may contain moisture from the compressed inert gas or the surrounding environment. By positioning the dryer 410 on the first leg 161, it can effectively remove this moisture using a desiccant or refrigeration method before the inert gas is released. This helps prevent any condensation that could damage components, especially in sensitive systems like aircraft engines. The addition of a dryer 410 ensures the hot inert gas is clean and dry, maintaining the efficiency and longevity of the cooling system while preventing issues like icing, corrosion, or performance degradation.

Figure 5A:
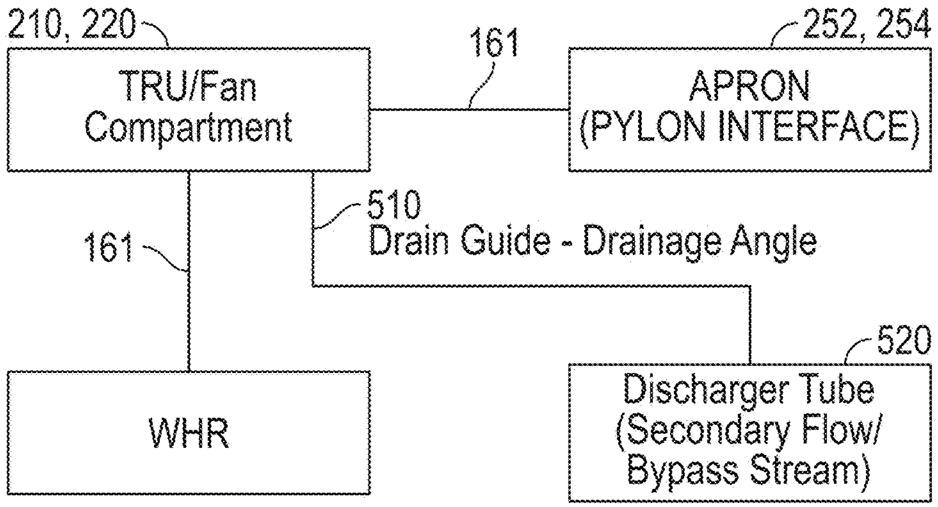
FIG. 5A illustrates a flow diagram for a water collector system for use with the thermal management plumbing system of FIG. 1A or 1B, in accordance with aspects of the present disclosure.
Figure 5B:
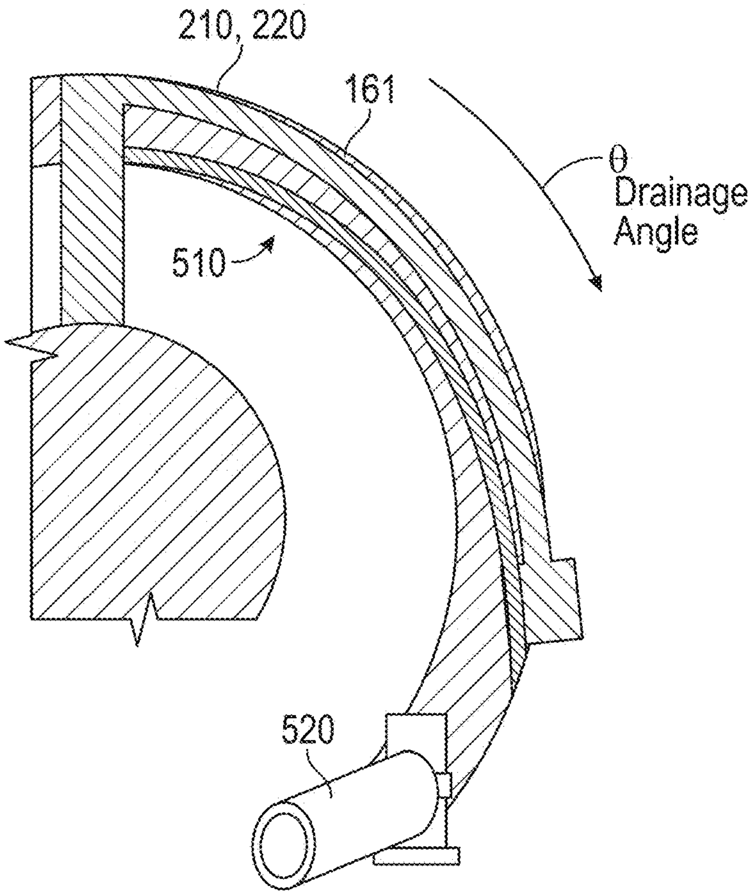
FIG. 5B illustrates a side cutaway view of a water collector system for use with the thermal management plumbing system of FIG. 1A or 1B, in accordance with aspects of the present disclosure.
Figure 5C:
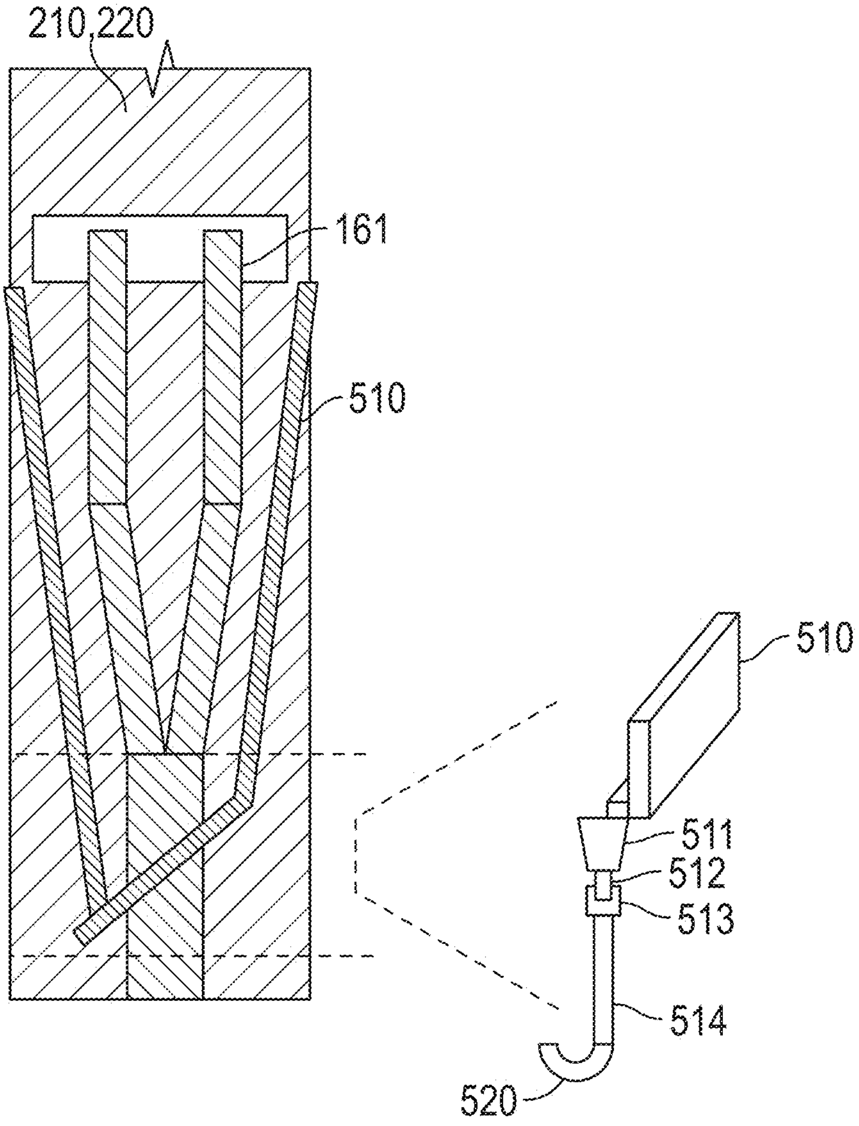
FIG. 5C illustrates a cutaway view of a water collector system for use with the thermal management plumbing system of FIG. 1A or 1B, in accordance with aspects of the present disclosure.

FIGS. 5A-5C illustrate a water collector system of the thermal management plumbing system 100 of FIGS. 1A and 1B, in accordance with an aspect of the present disclosure. As shown in FIG. 5B, a drain guide 510 is joined (e.g., welded, brazed, or bolted) to the outer case of the TRU 220 or to a fixed fan duct of the fan compartment 210. The drain guide 510 is configured to direct water from melted ice into a discharger tube 520. In aspects of the present disclosure, the angle $\phi$ may be 90 degrees with respect to the first leg 161 at a given location. As shown in FIG. 5C, the discharger tube 520 may include a collector cone (e.g., a sheet metal cone) 511, a welded tube 512, a fitting connection 513, and a drain line 514 for directing water from the drain guide 510 into the discharger tube 520.

Figure 6:
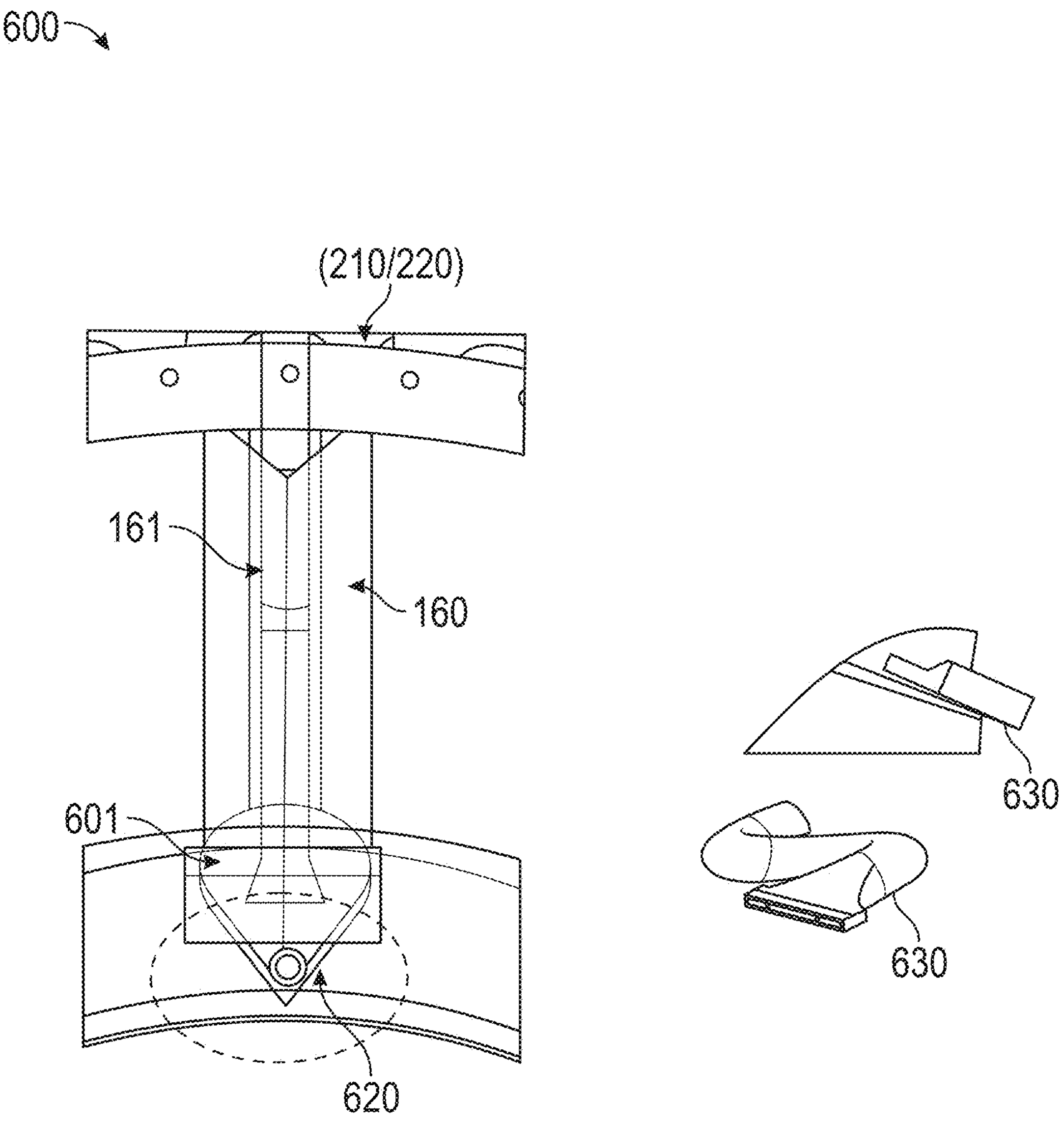
FIG. 6 illustrates a bifurcation water collector system for use with the thermal management plumbing system of FIG. 1A or 1B, in accordance with aspects of the present disclosure.

FIG. 6 illustrates a water collector system 600 of the thermal management plumbing system 100 of FIGS. 1A and 1B, in accordance with an exemplary embodiment. As shown in FIG. 6, a cover plate 601 is mounted on the outer surface of the WHR HX 160, featuring a cone design and specific angle to effectively guide water towards the trailing edge portion where the flange port of the discharger tube 620 is located. The discharger tube 620 is securely connected to the flange port via a welded or threaded joint, ensuring a robust and leak-resistant connection for water drainage. Additionally, a vacuum cleaner flange 630 is disposed at an angle of 0 degrees to optimize the suction of water from the thermal management plumbing system 100. The flange 630 is affixed to the system through bolted connections to ensure mechanical stability, and it is configured to connect directly to a suction hose or duct, which leads to the exhaust gases with secondary air (e.g., bypass stream). This configuration allows for efficient removal of water by creating a vacuum or suction effect, effectively draining the water away from the thermal management plumbing system 100. The entire assembly is sealed at all connection points, ensuring no leaks or interference with the surrounding components, while maintaining smooth water flow towards the discharger tube 620 for removal through the exhaust system.

The aspects disclosed herein are examples of the disclosure and may be embodied in various forms. For instance, although certain aspects herein are described as separate aspects, each of the aspects herein may be combined with one or more of the other aspects herein. Specific structural and functional details disclosed herein are not to be interpreted as limiting, but as a basis for the claims and as a representative basis for teaching one skilled in the art to variously employ this disclosure in virtually any appropriately detailed structure.

The phrases "in an aspect," "in aspects," "in various aspects," "in some aspects," or "in other aspects" may each refer to one or more of the same or different aspects in accordance with this disclosure.

Further aspects of the present disclosure are provided by the subject matter of the following clauses.

A gas turbine engine for an aircraft includes: a thermal bus including a plumbing system, a cryogenic fuel source, a compressor section, a combustion section, and a waste heat recovery (WHR) heat exchanger (HX). The plumbing system has a cold leg and a hot leg. The cryogenic fuel source comprises hydrogen in a liquid phase and in fluid communication with the cold leg of the plumbing system. The compressor section is in fluid communication with the plumbing system. The combustion section is in fluid communication with the plumbing system. The waste heat recovery (WHR) heat exchanger (HX) is thermally coupled to a core airflow path downstream of a turbine section and configured to transfer heat to the plumbing system to vaporize the hydrogen prior to delivery to the combustion section. The gas turbine engine according to the preceding clause, wherein the plumbing system comprises tubes, wherein the tubes include at least one of: one or more insulation layers; one or more coatings configured to provide a surface roughness of the tubes that is a lower surface roughness than an untreated tube; or a coolant material disposed on an outside surface of the tubes.

The gas turbine engine according to any of the preceding clauses, wherein the plumbing system comprises one or more portions having an outer tube encapsulated by an inner tube.

The gas turbine engine according to any of the preceding clauses, wherein the plumbing system comprises tubes and a thermocouple thermally coupled to the tubes.

The gas turbine engine according to any of the preceding clauses, wherein the plumbing system comprises spiral tubes disposed around the tubes.

The gas turbine engine according to any of the preceding clauses, further comprising a bleed system including: a bleed line in fluid communication with the compressor section; and a vortex cooler in fluid communication with the bleed line and configured to generate a temperature differential between a hot stream and a cold stream of inert gas.

The gas turbine engine according to any of the preceding clauses, wherein the vortex cooler defines a vortex spin chamber configured to spin heated inert gas and exhaust inert gas at a first temperature.

The gas turbine engine according to any of the preceding clauses, further comprising: a control valve; and a temperature regulator configured to supply a second leg of the WHR HX with heated inert gas of a second temperature higher than the first temperature.

The gas turbine engine according to any of the preceding clauses, further comprising: a control valve; and a temperature regulator configured to supply a first leg of the WHR HX with inert gas at the first temperature.

The gas turbine engine according to any of the preceding clauses, further comprising a bleed system including a dryer that is in fluid communication with the compressor section.

The gas turbine engine according to any of the preceding clauses, wherein the dryer is in fluid communication with a first leg of the WHR HX.

The gas turbine engine according to any of the preceding clauses, wherein the bleed system further comprises a vortex cooler in fluid communication with a second leg of the WHR HX.

A bleed system for a gas turbine engine includes a bleed line, a vortex cooler, and a flow path. The bleed line configured to supply heated inert gas from a compressor section. The vortex cooler in fluid communication with the bleed line and configured to generate a temperature differential between a first inert gas stream and a second inert gas stream. The flow path directing at least one of the first inert gas stream or the second inert gas stream to a waste heat recovery (WHR) heat exchanger (HX) that is in fluid communication with a combustion section of a gas turbine engine.

The bleed system according to the preceding clause, wherein the vortex cooler defines a vortex spin chamber configured to spin heated inert gas and exhaust cool inert gas to cool engine control hardware.

The bleed system according to any of the preceding clauses, further comprising: a control valve; and a temperature regulator in fluid communication with a second leg of the WHR HX and configured to regulate delivery of the heated inert gas.

The bleed system according to any of the preceding clauses, wherein the control valve is also in fluid communication with a first leg of the WHR HX and with the vortex spin chamber.

The bleed system according to any of the preceding clauses, further comprising: a dryer that is in fluid communication with the compressor section.

The bleed system according to any of the preceding clauses, wherein the dryer is configured to supply dry inert gas to the first leg of the WHR HX.

It should be understood that the description herein is only illustrative of this disclosure. Various alternatives and modifications can be devised by those skilled in the art without departing from the disclosure. Accordingly, this disclosure is intended to embrace all such alternatives, modifications, and variances. The aspects described are presented only to demonstrate certain examples of the disclosure. Other elements, steps, methods, and techniques that are insubstantially different from those described above and/or in the appended claims are also intended to be within the scope of the disclosure.

What is claimed is:

1. A gas turbine engine for an aircraft, the gas turbine engine comprising:

a thermal bus including a plumbing system having a cold leg and a hot leg;

a cryogenic fuel source comprising hydrogen in a liquid phase and in fluid communication with the cold leg of the plumbing system;

a compressor section;

a combustion section configured to receive vaporized hydrogen from the plumbing system;

a waste heat recovery (WHR) heat exchanger (HX) thermally coupled to a core airflow path downstream of a turbine section and configured to transfer heat to the plumbing system to vaporize the hydrogen prior to delivery to the combustion section, wherein the WHR HX uses a heat transfer medium to vaporize the hydrogen; and a drainage system configured to remove water resulting from melted ice on the plumbing system, the drainage system including at least one drain guide configured to direct the water resulting from the melted ice into a discharger tube.

2. The gas turbine engine of claim 1, wherein the plumbing system comprises tubes, wherein the tubes include at least one of:

one or more insulation layers;

one or more coatings configured to provide a surface roughness of the tubes that is a lower surface roughness than an untreated tube; or a coolant material disposed on an outside surface of the tubes.

3. The gas turbine engine of claim 1, wherein the plumbing system comprises one or more portions having an outer tube encapsulated by an inner tube.

4. The gas turbine engine of claim 1, wherein the plumbing system comprises tubes and a thermocouple thermally coupled to the tubes.

5. The gas turbine engine of claim 2, wherein the plumbing system comprises spiral tubes disposed around the tubes.

6. The gas turbine engine of claim 1, further comprising a bleed system including:

a bleed line in fluid communication with the compressor section;

an inert gas tank feeding the bleed line; and a vortex cooler in fluid communication with the bleed line and configured to generate a temperature differential between a hot stream and a cold stream of inert gas, wherein the inert gas tank is upstream of the vortex cooler.

7. The gas turbine engine of claim 6, wherein the vortex cooler defines a vortex spin chamber configured to spin heated inert gas and exhaust inert gas at a first temperature.

8. The gas turbine engine of claim 7, further comprising:

a control valve; and a temperature regulator configured to supply a second leg of the WHR HX with heated inert gas of a second temperature higher than the first temperature.

9. The gas turbine engine of claim 7, further comprising:

a control valve; and a temperature regulator configured to supply a first leg of the WHR HX with inert gas at the first temperature.

10. The gas turbine engine of claim 1, further comprising a bleed system including:

a dryer that is in fluid communication with the compressor section;

a bleed line in fluid communication with the compressor section; and an inert gas tank feeding the bleed line.

11. The gas turbine engine of claim 10, wherein the dryer is in fluid communication with a first leg of the WHR HX.

12. The gas turbine engine of claim 10, wherein the bleed system further comprises a vortex cooler in fluid communication with a second leg of the WHR HX.

13. The gas turbine engine of claim 1, wherein the discharger tube is positioned within a fan compartment or a thrust reverser unit.

14. A bleed system for a gas turbine engine, the bleed system comprising:

a bleed line configured to supply heated inert gas from a compressor section;

a vortex cooler in fluid communication with the bleed line and configured to generate a temperature differential between a first inert gas stream and a second inert gas stream;

a flow path directing at least one of the first inert gas stream or the second inert gas stream to a waste heat recovery (WHR) heat exchanger (HX) that is in fluid communication with a combustion section of the gas turbine engine; and an inert gas tank feeding the bleed line, wherein the inert gas tank is upstream of the vortex cooler.

15. The bleed system of claim 14, wherein the vortex cooler defines a vortex spin chamber configured to spin heated inert gas and exhaust cool inert gas to cool engine control hardware.

16. The bleed system of claim 15, further comprising:

a control valve; and a temperature regulator in fluid communication with a first leg of the WHR HX and configured to regulate delivery of the heated inert gas to the first leg.

17. The bleed system of claim 16, wherein the control valve is also in fluid communication with a second leg of the WHR HX and with the vortex spin chamber.

18. The bleed system of claim 17, further comprising:

a dryer that is in fluid communication with the compressor section.

19. The bleed system of claim 18, wherein the dryer is configured to supply dry inert gas to the second leg of the WHR HX.

20. The bleed system of claim 14, wherein the vortex cooler is configured to deliver heated inert gas to a first leg of the WHR HX.

* * * * *